Oct. 3, 1944.          W. C. GRABAU           2,359,308
                    ELECTRICAL APPARATUS
                    Filed June 10, 1942
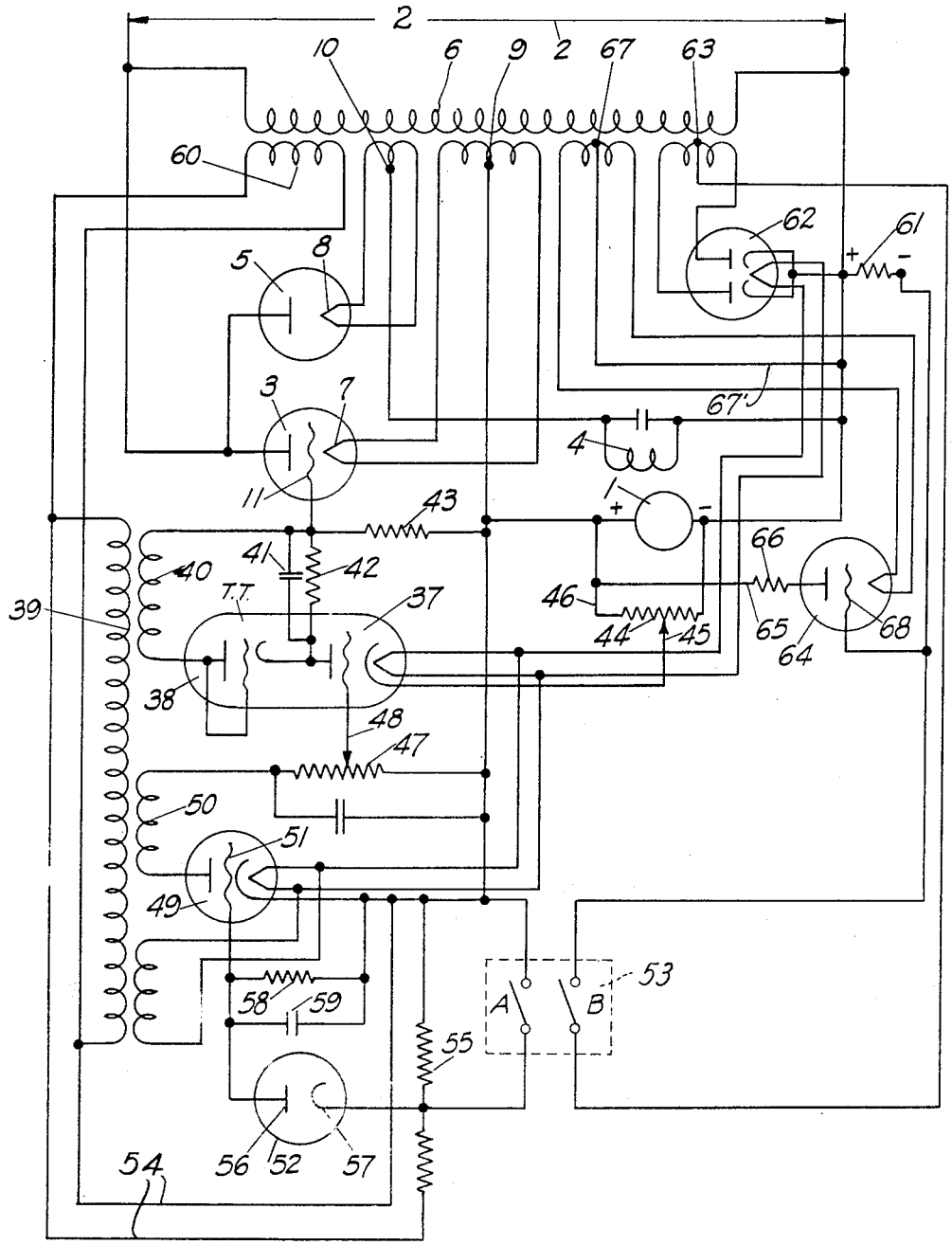
INVENTOR
WILLIAM CHRISTIAN GRABAU
BY Ezekiel Wolf
    ATTORNEY Patented Oct. 3, 1944

2,359,308

UNITED STATES PATENT OFFICE 2,359,308

ELECTRICAL APPARATUS

William Christian Grabau, Brighton, Mass., assignor to Submarine Signal Company, Boston, Mass., a corporation of Maine Application June 10, 1942, Serial No. 446,460

6 Claims. (Cl. 172—239)

The present invention relates to a dynamic brake for a motor and provides means which operates both in effecting a proper starting and a proper stopping of an electric motor with the desired acceleration and deceleration. In general, dynamic braking action for a motor is accomplished by shunting the motor and using up the motor energy by the generation of current in a low resistance shunt circuit. Various methods of control have been employed for this purpose and the chief difficulties reside in efficient operation and reliable and accurate performance of the system under varying conditions.

In the present invention the dynamic braking of the motor circuit is accomplished by shunting the motor with a circuit including a proper current-limiting resistor and a gaseous control tube which is controlled in the starting and stopping operation of the motor for the desired purpose.

In the starting operation this loaded shunt circuit of the motor is held open by the proper biasing of the grid of the gaseous control tube through a rectified potential source supplied from an alternating current power source which may also drive the motor itself. However, if desired, a constant direct current power source may be employed and the invention may be applied in this respect both to alternating and direct current motors.

The present invention also may incorporate means for properly but rapidly starting the motor. This means is similar to that disclosed in my copending application Serial No. 432,982, filed March 2, 1942.

Further advantages and merits of the present invention will be further explained and more readily understood from the description of an embodiment of the invention contained in the specification below when taken in connection with the drawing shown in the wiring diagram of the system of the invention.

In the drawing the motor 1 may be a direct current type operated from an alternating current source 2 through a gaseous control and rectifier tube 3, the operation and control of which will be explained later. The motor field 4 may also be supplied with direct current through the rectifier tube 5 similarly connected across the alternating current supply line 2. A transformer 6 connected across the supply source 2 may be used to supply the cathodes 7 and 8 to the tubes 3 and 5, respectively, by means of independent secondary windings 9 and 10 of the transformer 6. The grid 11 of the tube 3 is controlled by means of a control circuit which is similar to that described in my above-mentioned copending application. This includes a twin triode tube TT one section of which is used as a triode control 37 having a cathode, anode and grid electrodes and a second triode section 38 in which the grid and the plate are connected together forming thereby a simple thermionic rectifier valve.

Alternating current is supplied to the transformer 39 through the secondary 60 of the transformer 6. The secondary of the transformer 39 has a number of windings which are used as supply sources for the rest of the circuit. One secondary winding 40 supplies power to the cathode-anode circuit of the triode section 38. In this cathode-anode circuit there is a shunt connection comprising a condenser 41 and a resistor 42. The anode-cathode circuit of the triode control portion 37 comprises the shunt connection formed by the condenser 41 and the resistor 42, which shunt connection is in series with the resistor 43. There is also in this anode-cathode circuit a portion of the shunt motor resistance 44 which has an adjustable tap 45 which is connected to the cathode of the tube 37. The potential in the line 46, which is the junction line between the resistances 43 and 44, is connected to the positive side of the grid biasing resistor 47 to which the grid of the tube 37 is connected through an adjustable tap 48 so that the resistance 47 furnishes a negative bias component for the grid of the tube 37.

Rectified direct current is supplied to the resistance 47 by means of a rectifier circuit which includes a rectifier tube 49 whose cathode-anode circuit is energized through the secondary winding 50 of the transformer 39 and whose grid electrode 51 is controlled through the diode tube 52 operated in connection with the starting-stopping switch 53 having two sets of contacts A and B. Current is maintained through the diode 52 when the contacts A are apart by means of the supply lines 54 which are connected to the terminals of a resistor 55 and which provides a potential between the anode 56 and the cathode 57 in the tube 52 through the resistance 58. Because of the potential existing across the resistance 58, the condenser 59 is always charged while current flows in the tube 52 and while potential exists across the resistance 55. This flow of current maintains the grid 51 of the tube 49 negative at all times and under this condition prevents a potential from being established across the resistance 47, thus permitting current to flow in the triode section 37 of the tube TT and thereby maintaining the open circuit conditions in the tube 3. In this inoperative state of the motor 1 the contacts B are also apart as a result of which no potential exists across the resistor 61 which is in series with the contacts B in the cathode-anode circuit of the rectifier tube 62 which has its anode-cathode circuit energized through the secondary winding 63 of the transformer 6. The resistor 61 is also in the grid circuit of the gaseous control tube 64. This control tube 64 is shunted across the motor terminals by means of a circuit including the line 65 from one side of the motor 1, the current-limiting resistor 66, the tube 64, the cathode leads of the tube 64, the secondary winding 67 and the line 67' from it to the other side of the motor. When the switch contacts B are apart, no voltage exists across the resistance 61 with the result that the grid 68 of the control tube 64 is at the same potential as the cathode of the tube and therefore the control tube acts as a shunt across the motor terminals. With the simultaneous closing of the contacts A and B a negative potential is supplied to the grid 68 of the control tube 64, thus effectively opening the shunt through the current-limiting resistor 66 and removing any dynamic braking effect which may exist across the motor terminals. At the same time that this occurs, the potential across the resistance 55 is reduced to zero, permitting the condenser 59 to discharge across the resistance 58 of the vacuum tube 49, thus gradually establishing a potential in the resistance 47 which acts to cut off the flow of current in the triode section 37 of the tube TT. This, as explained in the previous copending application mentioned above, reduces the bias on the control grid 11 of the gaseous control tube 3, in effect closing the circuit to the motor for the application of power to it. The continued operation of the system is controlled by the positioning of the taps 45 and 48 as explained in my copending application mentioned above.

When it is desired to stop the motor, as, for instance, when the motor is to be reversed, contacts A and B are open. With the opening of contact B a bias on the grid 68 of the tube 64 is removed and the power in the motor is thereupon delivered across the current-limiting resistor 66 as though the motor were a generator. This resistance should be properly chosen preferably so that the resistance of the external circuit is equal to the motor resistance whereby the maximum dynamic braking torque will be obtained.

The present invention is particularly applicable to systems in which the motor 1 is used to drive some training gear, as, for instance, a searchlight or some sound or radio ranging equipment where it is necessary and desirable to reverse the direction of rotation of the motor at will. Under these conditions the contact switches A and B may be tied up with the reversing mechanism so that automatically as the motor is reversed, the contacts A and B are opened and then closed.

Having now described my invention, I claim:

1. In a motor circuit including an electric motor driven by an electric power source, dynamic brake means including a circuit shunting the terminals of the motor having a resistance and a gaseous conduction tube in series, said gaseous conduction tube having a grid control element and means normally negatively biasing said grid control element during the operation of said motor and switch means for removing said bias to provide dynamic brake action for said motor.

2. In a motor circuit including an electric motor operated from an alternating current power source, rectifier means for applying alternating current power to said motor and a shunt circuit including a resistance and a gaseous conduction tube having cathode-anode circuit connected in series with said resistance in said shunt circuit, said gaseous control tube having a grid electrode and means for supplying a negative bias to said grid electrode in normal operation of said motor and switching means operative with the opening of the power circuit for said motor for removing said negative bias to provide dynamic brake action for said motor.

3. In a system for operating a direct current motor from an alternating current source including a rectifier tube having a cathode and anode connected in series in said power source and grid control electrode means adapted to be energized for controlling the operation of the tube for supplying power to said motor, starting means comprising means for permitting the increase of current through said rectifier tube by a decrease of negative bias on said grid and a motor shunt circuit including a resistance, a gaseous control tube having a grid control electrode and means for simultaneously negatively biasing said gaseous control tube with the increasing of the current flow through said rectifier tube.

4. In a system for operating a direct current motor from an alternating current source including a rectifier tube having a cathode and anode connected in series in said power source and grid control electrode means adapted to be energized for controlling the operation of the tube for supplying power to said motor, starting means comprising means for permitting the increase of current through said rectifier tube by a decrease of negative bias on said grid and a motor shunt circuit including a resistance, a gaseous control tube having a grid control electrode and means for simultaneously negatively biasing said gaseous control tube with the increasing of the current flow through said rectifier tube, said means being also operable for removing said bias on said grid control simultaneously with the increasing of the bias on the grid of said rectifier for rapidly stopping said motor.

5. In a system for operating a direct current motor from an alternating current source including a rectifier having a control tube with a cathode, anode and control grid and a shunt circuit for said motor having a resistance, a control tube with cathode, anode and control grid, a rectifier power source and a switch in a series circuit forming a shunt across said motor, means including a second switch and a time-delay circuit for controlling the variation of potential on the control grid of the rectifier whereby the current passed by the rectifier increases on starting the motor according to a desired increase, means including a resistance connecting the grid of the control tube in the shunt circuit to a point in the shunt circuit whereby a negative bias is produced opening the shunt circuit when the shunt switch is closed, said switches adapted to be closed substantially at the same time whereby desired starting of said motor is obtained.

6. In a system for operating a direct current motor from an alternating current source including a rectifier having a control tube with a cathode, anode and control grid and a shunt circuit for said motor having a resistance, a control tube with cathode, anode and control grid, a rectified power source and a switch in a series circuit forming a shunt across said motor, means including a second switch and a time-delay circuit for controlling the variation of potential on the control grid of the rectifier whereby the current passed by the rectifier increases on starting the motor according to a desired increase, means including a resistance connecting the grid of the control tube in the shunt circuit to a point in the shunt circuit, whereby a negative bias is maintained keeping the shunt circuit opened while the shunt switch is closed and whereby the shunt circuit is closed producing the desired brake action when the switch is opened.

WILLIAM CHRISTIAN GRABAU.